United States Patent [19]

Dalby

[11] Patent Number: 4,465,951

[45] Date of Patent: Aug. 14, 1984

[54] BACKUP BEARING AND POWER TRANSFER ASSEMBLY FOR COMMUNICATION SATELLITE

[75] Inventor: James F. Dalby, Reston, Va.

[73] Assignee: Satellite Business Systems, McLean, Va.

[21] Appl. No.: 477,546

[22] Filed: Mar. 21, 1983

[51] Int. Cl.³ .................. H02K 16/00; H02K 7/20
[52] U.S. Cl. ...................... 310/114; 244/158 R; 244/176
[58] Field of Search .................. 310/112, 114, 77; 244/158 R, 158 R, 176, 165; 318/18

[56] References Cited

U.S. PATENT DOCUMENTS

| | | | |
|---|---|---|---|
| 2,578,837 | 12/1951 | Raney | 310/77 UX |
| 3,405,337 | 10/1968 | Popik | 318/18 |
| 3,452,349 | 6/1969 | Wood | 340/269 |
| 3,999,729 | 12/1976 | Muhlfelder et al. | 244/165 |
| 4,058,353 | 11/1977 | Frommlet et al. | 308/1 A |
| 4,181,201 | 1/1980 | McCarthy | 310/77 |
| 4,373,147 | 2/1983 | Carlson, Jr. | 310/114 |

FOREIGN PATENT DOCUMENTS 1295928 11/1972 United Kingdom ............... 244/165

Primary Examiner—J. D. Miller
Assistant Examiner—D. L. Rebsch
Attorney, Agent, or Firm—Pollock, Vande Sande & Priddy

[57] ABSTRACT

A bearing and power transfer assembly which includes a main bearing and auxiliary bearing for coupling a spun and despun shelf. The main bearing has a stator connected to the spun shelf, and a motor driven rotor connected to the stator of the auxiliary bearing. The rotor of the auxiliary bearing is connected to the despun shelf. Means are provided to maintain said auxiliary stator and rotor locked together until a failure of said main bearing occurs. A ground command frees the auxiliary bearing rotor and stator and a motor associated with the free rotor maintains a spinning torque on the despun shelf. Slip-ring and brush assemblies are included in each bearing assembly to provide electrical connections between spun and despun shelves.

7 Claims, 4 Drawing Figures

FIG. 2 PRIOR ART
FIG. 1
FIG. 3
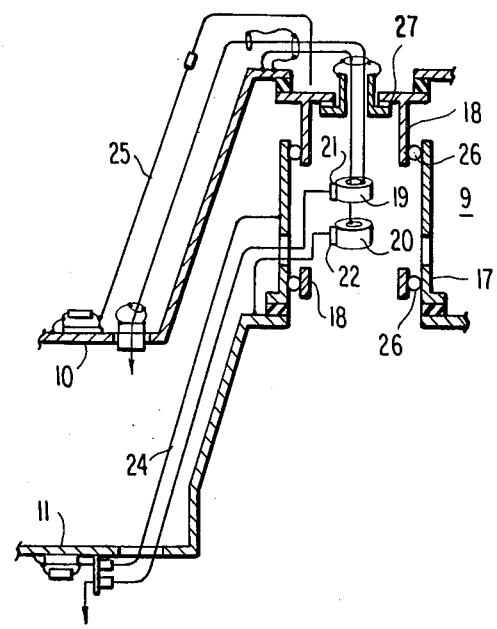
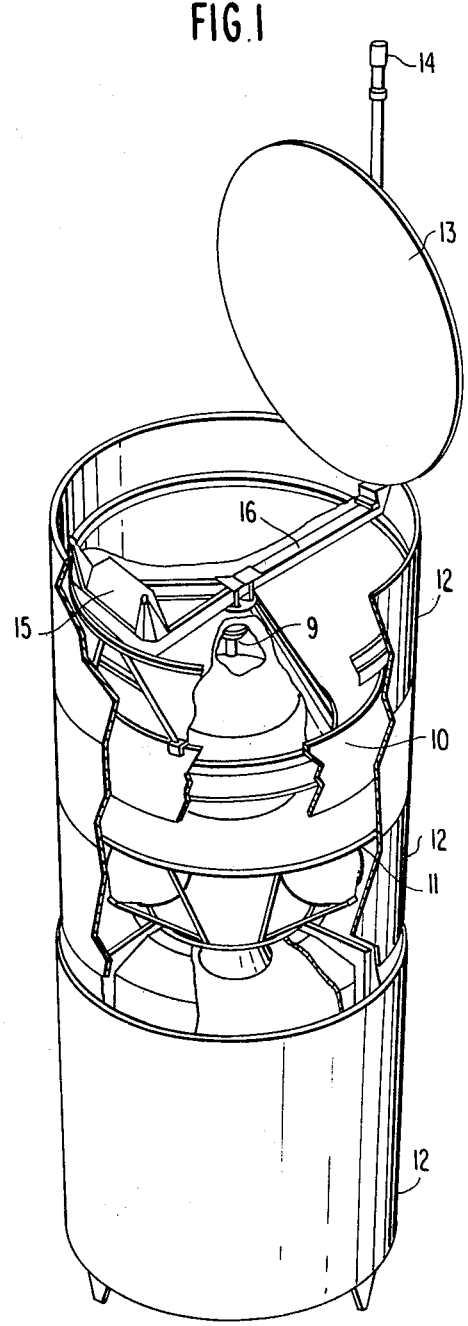
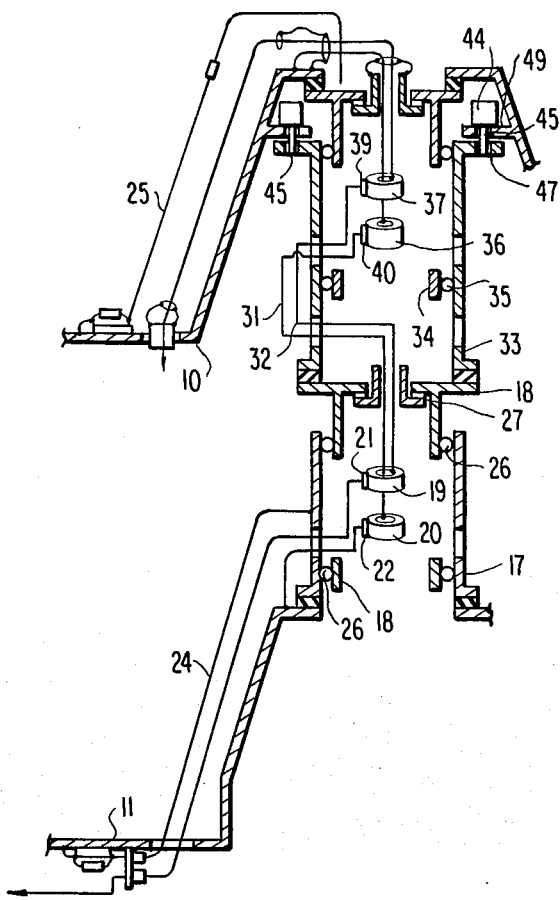

BACKUP BEARING AND POWER TRANSFER ASSEMBLY FOR COMMUNICATION SATELLITE

BACKGROUND OF THE INVENTION

The present invention relates to the communications satellite art. Specifically, an improved bearing and power transfer assembly for coupling a spun and despun shelf together in a spinning satellite is described.

Satellite transponders for permitting communications between two earth located stations have been in use for many years. Presently such satellites are located in geosynchronous orbits whereby their position with respect to the earth's surface remains relatively stationary to permit radio signals to be transmitted and received from stationary earth stations.

The satellite transponder, once in orbit, erects in response to a ground command a directional transmit-receive antenna. In order to receive and transmit through the transmit-receive antenna, the antenna must be maintained in an earthward-looking direction. The difficulty in maintaining the required antenna positioning results from a directional spin which the satellite, once in orbit, experiences at a rate of approximately one revolution per second. To avoid this difficulty, the antenna is despun by rotating the supporting shelf in a counter direction at the spin rate to achieve a relatively constant earthward look angle for the transmit-receive antenna.

The interface between the spun portion of the satellite and the despun shelf is provided by a bearing and power transfer assembly. The spinning or spun portion of the satellite contains batteries, apogee kick motors and earth sensors and decoders. The despun shelf carries the transmit antenna, telemetry receivers and TWT amplifiers heat sinked to the exterior of the despun shelf. The bearing provides a ball bearing interface between spun and despun shelves, and provides through a motor the requisite rotational torque to despin the despun shelf. The bearing also carries a plurality of brush-slip ring assemblies to carry power and telemetry signals between shelves.

The bearing and power transfer assembly has been identified in a report entitled "Summary Report of a Study of Increased Reliability and Lifetimes for Future Communcations Satellites", under a contract to the European Space Agency, as a major source of satellite failure. Once the despin bearing structure fails, the entire satellite is rendered useless for further communication.

The present invention seeks to provide a back-up bearing structure which can be activated by ground commands in the event of a failure of the main bearing and power transfer assembly, thus restoring the satellite to use.

SUMMARY OF THE INVENTION

It is a primary object of this invention to avoid the consequences of a failure in a satellite bearing and power transfer assembly.

It is a more specific object of this invention to provide a back-up bearing and power transfer assembly to a main bearing and power transfer assembly of a satellite.

These and other objects are provided by apparatus in accordance with the invention. A back-up bearing with slip-rings and brushes are provided to effect power transfer to a despun shelf in a geosynchronous orbiting communications satellite. When loss of a main bearing and power transfer assembly occurs, a ground command to the satellite will free the second back-up bearing into operation, avoiding what had been previously a complete loss of the satellite.

In a preferred embodiment of the invention, a main bearing having a stator connected to the spun shelf of a satellite supports through a ball bearing assembly, a motor driven rotor for rotation. As used herein, stator and rotor are relative terms meaning one rotates with respect to the other, and not that one is always stationary or rotating. Connected to the stator and rotor are a plurality of slip-ring assemblies which include brushes and associated slip-rings for carrying main power and telemetry signals between spun and despun portions of the satellite.

A second stator supporting yet another rotor through ball bearings, and an associated motor are connected to the main bearing rotor. The second rotor is supported to the second stator through a ball bearing assembly and the entire second rotor stator assembly is free to rotate with the rotor of the main bearing in the absence of a failure. The relative rotation of the second stator and second rotor is arrested by ground controlled actuators. The second motor remains unenergized until a ground command initiates operation. The despun shelf is connected to the second rotor. A plurality of slip-rings and brushes carry power and telemetry signals to and from the despun shelf through the second stator and rotor.

When a failure occurs in the main bearing structure, a ground command is given to energize the second motor while simultaneously operating the actuators freeing the second rotor to rotate with respect to the stator. Thus, the despun shelf continues to rotate with power and telemetry connections between the spun and despun portions of the satellite remaining uninterrupted through respective slip-rings and brushes.

DESCRIPTION OF THE FIGURES

FIG. 1 illustrates a typical geostationary satellite having a spun and despun shelf.

FIG. 2 illustrates a typical prior art bearing and power transfer structure between spun and despun shelves.

FIG. 3 illustrates a first schematic illustration of a bearing and power transfer in accordance with a first embodiment of the invention.

DETAILED DESCRIPTION OF A PREFERRED EMBODIMENT

Figure 4:
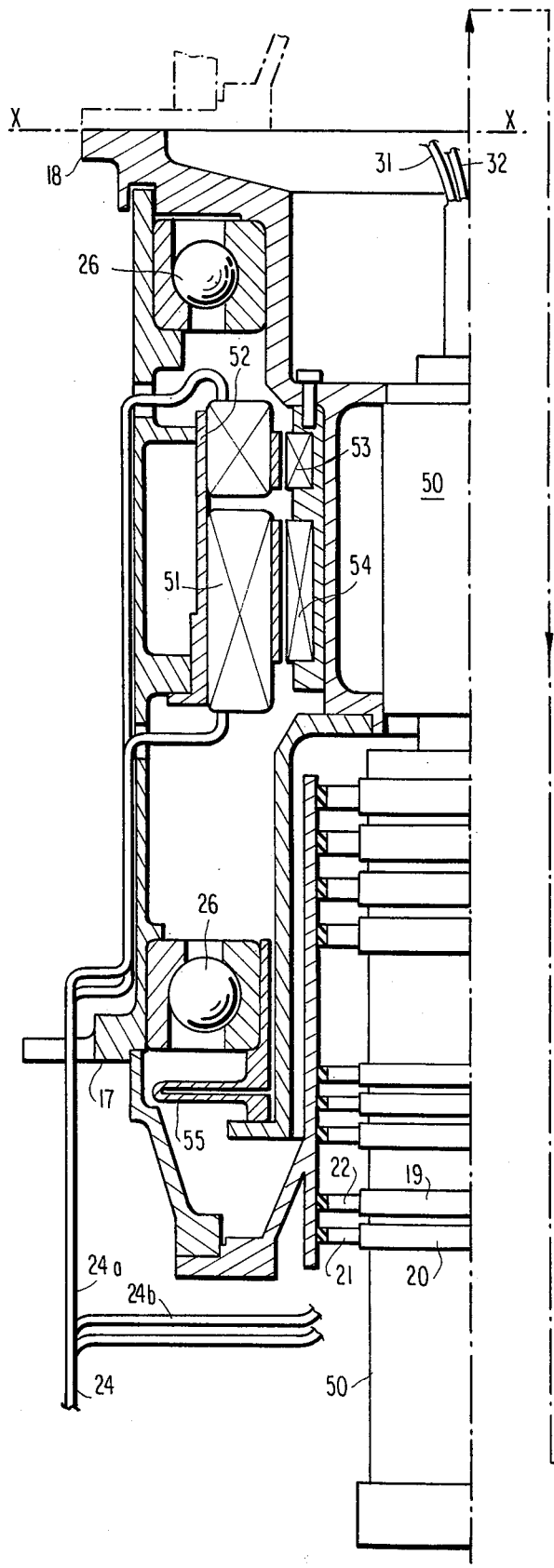
FIG. 4 is a more detailed section view of the bearing and power transfer unit of FIG. 3.
Figure 4:
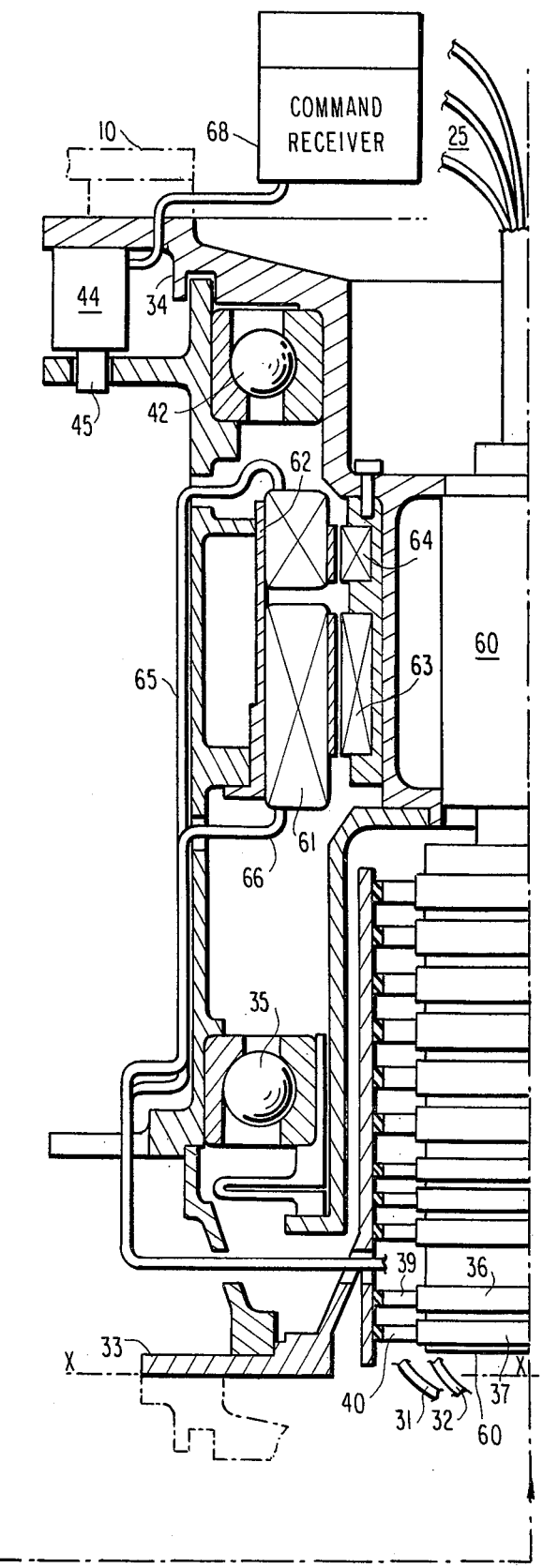

Referring now to FIG. 1, there is shown a typical communications satellite which is placed in a geostationary orbit for use as a communications satellite transponder. The satellite includes a spun shelf 11 which, during orbiting of the satellite, rotates about its axis at an angular rate of approximately 1 revolution per second. The solar array surface 12 is disposed around the periphery of the satellite and deployed during orbit to provide for maximum illumination of the solar cells contained on the surface of the satellite. In order to correctly position reflector 13 to receive and transmit information from predetermined locations on earth, a despun shelf 10 is provided which is rotated in a direction to maintain reflector 13 in a position for receiving and transmitting radio signals to earth. The despun shelf 10 is driven through a motor which applies sufficient torque to the despun shelf 10 to maintain the shelf and its attached reflector 13 in a predetermined orientation.

Once positioned, the antenna reflector 13 and its feed 15 may be further positioned by varying the rotational speed of the despun shelf to affect precise positioning with respect to a beacon station and hence to multiple earth stations communicating with the satellite.

Much of the electronics necessary to operate the satellite in response to ground command is located on the despun shelf 10. Power supplies are generally maintained in the spun shelf 11, and the spun shelf is connected to the despun shelf 10 through a bearing and power transfer assembly 9. The bearing and power transfer assembly 9 comprises the basis of the present invention.

Referring to FIG. 2, an example of a prior art bearing and power transfer assembly 9 is shown. The spun shelf 11 includes power and telemetry conductors 24 which connect the spun shelf 11 with a first pair of brushes 21 and 22. Brushes 21 and 22 are part of a stator unit 17 which rotates with the spun shelf 11. Slip-rings 19 and 20 are integral with a rotor 18, the rotor 18 supported through bearings 26 to the stator 17. Two sets of bearings 26 permit the rotor 18 to rotate with respect to stator 17. Further, a motor, not shown, is conventionally used to rotate rotor 18 with respect to stator 17 to achieve the despun effect on despun shelf 10. Although only two slip-rings and brushes 18, 21, and 21, 22, are shown in FIG. 2, in practice many more power and telemetry signal paths are provided by additional slip-ring brush assemblies. Conductors 25 supply the signal and power current from the slip-rings to the despun shelf 10.

Thus, by using the bearing supported rotor stator combination and associated slip-ring brush combinations, it is possible to achieve a despun rotational effect for shelf 10.

As earlier stated, the satellite becomes inoperative when the bearing assembly fails, prohibiting the despun shelf 10 from being correctly rotated to avoid misaligning the antenna reflector 13 with respect to a beacon station. The present invention, an embodiment of which is schematically shown in FIG. 3, provides a back-up bearing to avoid the consequences of a loss of the main bearing which totally shuts down operation of the satellite because of the aforementioned mispositioning of reflector 13.

Referring now to FIG. 3, the despun shelf 11 is shown with the conductor 24 carrying power and telemetry signal information to and from a pair of brushes 21 and 22. The brushes 21 and 22 are in combination with slip-rings 19 and 20 integral to a rotor assembly 18. As before, rotor assembly 18 is connected to stator 17 through a pair of main bearing assemblies 26. The motor for effecting rotation of rotor 18 with respect to stator 17 is the same as of the prior art devices, especially those depicted in FIG. 2, and rotation of rotor 18 maintains despun shelf 10 stationary with respect to the earth.

Associated with the aforementioned main bearing is an auxiliary bearing which includes a stator 33, rotor 34, slip-ring and brush assembly 36, 37, and 39, 40. As in the main bearing, a pair of bearing assemblies 35 permit rotation of rotor 34 with respect to stator 33. However, during normal operation of the satellite, when the main bearing is properly operating, a plurality of explosive actuators 44, having a retractable pin 45, maintain the rotor 34 fixed with respect to stator 33. Only when a ground command is received which is initiated upon a fault of the main bearing are the pins 45 retracted and the rotor 34 permitted to rotate with respect to stator 33. A second motor is also provided in the auxiliary bearing to effect rotation of rotor 34 with respect to stator 33 upon initiation of the ground command. The motor for an auxiliary bearing is likewise connected through the slip-ring assembly of the main bearing to receive power and an actuation command from the telemetry receiver. The number of actuators is preferably 4, however, more or less may be required, depending upon the size of the satellite.

Thus, when the ground control station detects a failure in the main bearing 9, explosive actuators 44 are actuated as well as a power signal applied to the motor of the auxiliary bearing to permit rotation of the despun shelf 10 and rotor 34 with respect to stator 33. In this way, the satellite is not rendered totally inoperative as a result of a malfunction of the main bearing and power assembly.

Referring now to FIG. 4, there is shown a half-section of the bearing and power transfer assembly in the preferred embodiment of the invention. The bearing and power transfer assembly is shown with the main bearing on the left and the auxiliary bearing on the right. The main bearing assembly includes a berylium shaft 50 which is rotated to effect motion between rotor 18 and stator 17. The berylium shaft 50 is central to a dry lubricated slip-ring assembly, two of the slip-rings being identified as 19 and 20, with corresponding brushes 21 and 22. The slip-rings and brush assemblies carry both power and telemetry signals between the spun and despun shelves. The largest slip-ring and brush assembly shown is used to carry the power, whereas the smaller slip-rings and associated brushes carry telemetry signals.

The berylium shaft 50 is connected to the rotor 18 which comprises a berylium spinning forming a flange member, and the two connected members rotate together. Rotation of the rotor 18 and shaft 50 is effected by a motor comprising permanent magnet 54 connected to the rotor 18, and a stator winding 51 which is connected adjacent the permanent magnet 54 on the stator 17. The bearing assembly 26 which holds the rotor and stator together, are stainless steel angular contact ball bearings. The bearings are preferably of the highest precision AFBMA Class ABEC-9 tolerances, with grade 5 balls to assure precision contact and rotation. Nominal contact angle for the bearings is 25° and a cotton-phenolic bowl cage is provided for the balls.

Power for the motor stator winding 51 is provided through connection lines 24a. The motor is a brushless, DC torque motor which provides 0.80 foot pounds at 24 volts. The resolver assembly including magnet 53 and winding 52 provide position sensing for the rotor 18 with respect to the stator. A sense winding 52 detects a pulse every time the magnet 53 passes by to provide a precise indication of the rotor position. A similar resolver is located 180° from the shown resolver to effect a second coordinate reading for the rotor. Thus, the outputs from the resolvers 52 will indicate the precise position of rotor 18.

Additional to the lower main bearing 26 is a steel preload spring 55 which, during launch, are employed with locks not shown to maintain the despun rotor 18 rigid with stator 17 to avoid any damage to the bearing structure. Springs 55 are included in the lower bearing assembly which, when the launch is completed, under ground command, frees the rotor and stator units. Spring 55 is utilized to restore the rotor and stator to appropriate position prior to energization of the motor.

The slip-ring assembly 19, 20 is connected via conductors 31 and 32, which constitute only two of a plurality of conductors and are central to the shaft 50 and supply the slip-ring connections to additional brushes and slip-rings on the auxiliary bearing to be now described.

The right side of FIG. 4 demonstrates the auxiliary bearing having a stator 33 connected to the rotor 18 of the main bearing. The auxiliary bearing has a rotational axis common with the main bearing. The despun shelf 10 is shown connected to a rotor 34 of the auxiliary bearing. All bearing assemblies 42 and 35 are identical to those 26 of the main bearing assembly, and provide for rotation of the despun shelf 34 with respect to stator 33. Conductors 31 and 32 are exemplary of a bundle of conductors from the slip-ring assembly of the main bearing and connected to brushes 39 and 40 of the auxiliary bearing. Slip-rings 36 and 37, exemplary of the slip-ring assembly of the auxiliary bearing, are connected to conductors 25. Conductors 25 provide a path between conductors 24 through slip-ring assemblies 19, 20 of the main bearing and slip-rings 36 and 37 of the auxiliary bearing. The despun shelf 34 contains a command receiver 68 which upon receipt of an appropriate ground command, fires squib 44 retracting pin 45. Further, telemetry receiver 68, upon an additional command responsive to the determination that the main bearing has failed, energizes motor 61 winding to effect rotation of shaft 60, central to the auxiliary bearing.

A resolver 64, 62 is also provided and is connected to the slip-ring assembly 36, 37 to permit the determination of the angular position of despun shelf 34 with respect to stator 33.

As is the case with the main bearing to the left of FIG. 4, the bearings 35 and 42 are lubricated with an oil which is a mixture of 95% apiezone, a low vapor pressure hydrocarbon oil, and 5% lead napthanate. The bearing assembly includes an oil storage reservoir which continuously lubricates the bearings of the main and auxiliary bearings.

The brush slip-ring assembly of both the main and the auxiliary bearings are typically the combination of a ring material of silver which are contacted by a brush assembly spring loaded against the slip-rings. The brushes typically contain the lubricant which may be, as used in prior art slip-ring assemblies, a sintered composite of 85% silver, 3% graphite and 12% $MoS_2$.

In operation, the explosive squib 44 will maintain the despun shelf 10 integral with stator 33 and despinning of shelf 10 will result from the rotation of rotor 18 with respect to stator 17 of the main bearing. Power and telemetry signals will be conveyed through the slip-ring assemblies of the main bearing to the auxiliary bearing slip-ring brush assembly. Upon the detection of a failure of the main bearing, the ground control will issue a command to telemetry receiver 68 to activate squib 44 freeing the despun shelf 34 with respect to stator 33. Additionally, a command to activate motor 61 will be issued whereby rotation of despun shelf 34 with respect to stator 33 will commence.

Thus, there has been shown the provision of a pair of bearing assemblies to form a main bearing and auxiliary bearing in tandem. Failure of the main bearing will therefore not render the satellite inoperative, as ground commands may activate the auxiliary bearing to permit continued despinning of the transponder antenna system and associated electronics.

Thus, there has been described with respect to one embodiment a new bearing and power transfer assembly for a satellite which provides a back-up bearing in case of a main bearing failure. One skilled in the art will recognize yet other embodiments described more particularly by the claims which follow.

What is claimed is:

1. In a satellite system having a despun shelf and a spun shelf, an apparatus for coupling said shelves comprising:

first and second bearing members, the first of said bearing members having a stator fixed to said spun shelf, and a rotor integral with the stator of said second bearing, said second bearing having a rotor terminating in a flange extending over said second bearing stator and connected to said despun shelf, said flange having first and second apertures located on said flange opposite corresponding apertures on said second bearing stator; and first and second actuator operated retractable pins located in said apertures, said pins maintaining said second bearing rotor locked with respect to said second stator, whereby said second rotor, second stator and first rotor rotate with respect to said spun shelf, until said retractable pins are retracted upon a ground command permitting said second rotor to rotate.

2. The apparatus of claim 1 wherein each of said stators includes brushes, and each of said rotors includes conductive rings in contact with brushes on a respective stator, said rings and brushes forming a conductive path between said shelves.

3. The apparatus of claim 2 wherein each of said bearing members includes a motor, said motor including a field winding on the interior of said stator and a permanent magnet on said rotor.

4. In a satellite system having a spun and despun shelf, a bearing coupling said shelves comprising:

a first stator assembly coupled to said spun shelf, said stator assembly including a cylindrical bore including first and second bearing races, a plurality of brush members extending through said stator assembly, and a field winding disposed on the circumference of said cylindrical bore for generating a magnetic flux;

a rotor located within said cylindrical bore including first and second bearing races opposite said stator first and second races, said rotor and stator assembly connected by bearings in said races to form a single rotary bearing, a magnet on the circumference of said rotor and conductive rings opposite said brushes, said rotor extending from said bore;

a second stator connected to said rotor having a cylindrical bore along an extended axis of said first cylindrical bore which includes first and second bearing races, motor field winding and a plurality of brushes;

a second rotor located within said second stator cylindrical bore, said rotor including first and second bearing races opposite said second stator bearing races, a magnet opposite said field winding, and a plurality of conductive rings opposite said brushes, said second rotor connected via a set of bearings in said races to said stator and having at one end thereof a flange forming said despun shelf, said flange extending over a flange of said second stator and having first and second apertures along the periphery thereof in line with corresponding apertures in said second stator flange; and first and second retractable pins inserted in said rotor flange apertures and said stator flange corresponding apertures, whereby in the event of a failure by said first bearing, said second bearing is released by retracting said retractable pins, and said motor field winding on said second stator cylindrical bore when energized returns said despun shelf rotating with respect to said spun shelf.

5. In a satellite system having a spun and despun shelf, a bearing coupling said shelves comprising:

a main bearing assembly including: a stator connected to said spun shelf, said stator including a central bore, a motor winding along said bore, and a plurality of brushes facing said bore;

a rotor supported by first and second ball bearing assemblies along said central bore, said rotor including a plurality of slip rings for contacting said brushes, and a permanent magnet opposite said motor winding;

an auxiliary bearing assembly including: a second stator connected to said main bearing rotor, said stator including a central bore, a motor winding along said bore, a plurality of brushes along said bore, and a flange including a plurality of apertures around the circumference of the bore;

a rotor supported in said second stator bore by third and fourth bearing assemblies, including a plurality of slip rings for contacting said second stator plurality of brushes, said rotor including a flange having a plurality of apertures which are in line with said second stator flange apertures;

a despun shelf connected to said rotor flange; and conductor means connecting said main bearing slip rings to said auxiliary bearing brushes, whereby a plurality of electrical paths between said shelves are provided;

a plurality of ground controlled actuator means including a plurality of retractable pins connecting said rotor flange with said second stator flange through said apertures; whereby during normal operation said auxiliary bearing rotates with said main bearing in response to energization of said main bearing motor winding and during a failure of said main bearing, said retractable pins are displaced permitting said auxiliary bearing rotor to rotate with respect to said stator upon energization of said auxiliary bearing motor winding.

6. In a satellite system having a spun and despun shelf, a bearing coupling said shelves together comprising:

a first motor driven bearing assembly including a stationary part connected to a spun shelf, and a rotating part, said first motor driven bearing assembly including brush and slip-rings to provide an electrical path between said stationary and rotating parts;

a second motor driven bearing assembly including a stationary part connected to said first motor driven bearing assembly rotating part, and a rotating part connected to said despun shelf, said second motor driven bearing assembly including brush and slip-rings connected between a circuit of said despun shelf and said first motor driven bearing assembly brush and slip-rings; and means for inhibiting rotation of said second motor driven bearing assembly rotating part with respect to said second bearing assembly stationary part until a ground command is initiated indicating said first motor driven bearing assembly has experienced a failure.

7. The coupling of claim 6 wherein said means for inhibiting rotation comprises:

a retractable pin assembly including a plurality of pins which extend through said second motor driven rotary part engaging apertures of a stationary part, said pins being retracted in response to an electrical current generated in response to said ground command.

* * * * *